XR 3,267,555

SEARCH ROOM

SUBSTITUTE FOR MISSING XR

INVENTORS
James A. Berger, Michael G. Blankenship
BY Clarence R. Patty, Jr.
ATTORNEY Aug. 23, 1966 J. A. BERGER ETAL 3,267,555

IMAGE RECORDING

Filed May 11, 1964 3 Sheets-Sheet 2

INVENTORS
James A. Berger, Michael G. Blankenship
BY
Clarence R. Patty, Jr.
ATTORNEY

IMAGE RECORDING

INVENTORS
James A. Berger, Michael G. Blankenship
BY
Clarence R. Patty, Jr.
ATTORNEY United States Patent Office 3,267,555
Patented August 23, 1966

3,267,555

IMAGE RECORDING

James A. Berger, Horseheads, and Michael G. Blankenship, Corning, N.Y., assignors to Corning Glass Works, Corning, N.Y., a corporation of New York
Filed May 11, 1964, Ser. No. 366,506
8 Claims. (Cl. 29—155.5)

This invention relates to image recording and more particularly to electrostatic image recording. Still more specifically, the invention relates to a method of fabricating a control unit for an electrostatic recording device such as an electrostatic reproducing or office copying machine.

Electrostatic printing or image recording apparatus employing a photoconductive material, or a combination of such a material and light guides commonly known as fiber optics, are a relatively recent development in the electrostatic reproduction or image recording art. For example, there is disclosed in United States Patents 2,898,468, 3,007,049, and 3,050,623, issued to J. T. McNaney on August 4, 1959; October 31, 1961, and August 21, 1962, respectively, several arrangements of such recording apparatus. However, prior to the present invention, methods of fabrication of control units for such recording apparatus has been relatively difficult and such control units have, therefore, been relatively expensive. It is accordingly an object of the present invention to provide a simplified and relatively inexpensive method of fabricating an improved control unit for electrostatic reproducing or image recording apparatus employing photoconductive material and fiber optics.

Other objects and characteristic features of the invention will become apparent as the description proceeds.

In accomplishing the above objects of the invention, a plurality of pairs of discrete cells of photoconductive material are provided adjacent one end of first and second blocks or support members of a dielectric material, such second block being transparent and such blocks having a fiber optic bundle supported therebetween with corresponding cells of each of said pairs of cells uniformly provided adjacent the end of said bundle. First ends of each of such pairs of cells are connected together in series with an electrostatic printing contact provided between the cells of each pair. The free ends of corresponding cells of each pair of cells are connected together in multiple, all of such connections being made by a prescribed pattern of electrically conductive coating material provided adjacent said one end of the first and second blocks or support members.

The invention will best be understood by reference to the accompanying drawings wherein.

Similar reference characters refer to similar parts in each of the drawings.

Figure 1:
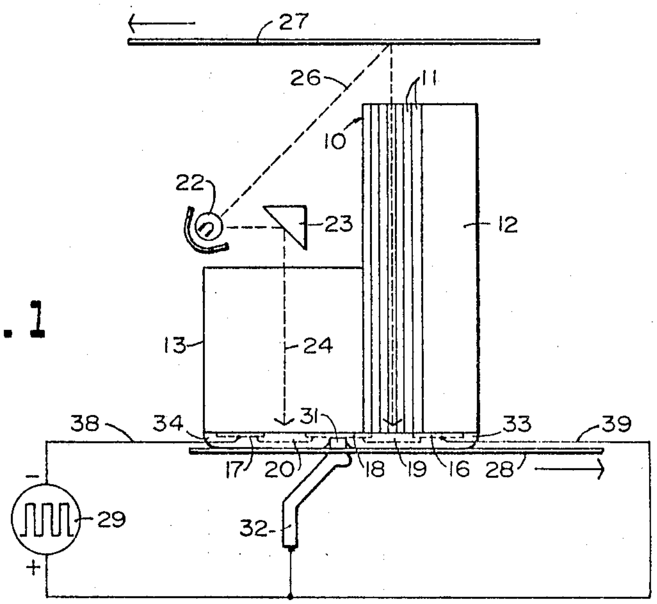
FIG. 1 is a diagrammatic representation of an electrostatic reproduction system employing a control unit such as disclosed herein.

It is pointed out that the dimensions of the various portions of the control units shown in the drawings are extremely exaggerated in order to facilitate illustration and an understanding of the construction of the control units in accordance with the invention. The preferred dimensions will be discussed in detail hereinafter in the description.

Referring to FIG. 1 of the drawings there is illustrated, as previously mentioned, a system for electrostatically depositing signals or charges on a special material such as dielectric paper in accordance with an optical image, drawing, or printed matter which it is desired to reproduce, such system employing a control unit fabricated in accordance with the present invention. As illustrated in FIG. 1 and also in FIG. 2 of the drawings, a fiber optic bundle 10 comprising a plurality of contiguous light conducting fibers, such as 11 and preferably made of glass, is longitudinally and vertically supported against a first dielectric support member 12, preferably opaque and preferably of glass. Such fiber optic bundle is securely affixed to member 12 as by fusion, for example when such member is of a glass composition. A second dielectric support member 13 which is transparent and also preferably made of glass is affixed to the side of the fiber optic bundle 10 opposite the side to which member 12 is affixed. Support member 13 is illustrated as having a dimension in height approximately half that of bundle 11 and the support member 12, and, if member 13 is made of glass, it may, for example, also be affixed to the bundle 10 by fusion.

As an example of possible dimensions of the fiber optic bundle and its individual fibers, each fiber may be as small as 0.0004 inch in diameter and from 0.5 inch to 2 inches in length. The bundle 10 of such fibers may be approximately 0.01 inch wide and, for the purposes of a discussion of the invention as illustrated in FIG. 1 of the drawings, may be approximately 12 inches long, such dimension not appearing in the diagrammatic view of FIG 1 and, for purposes of simplicity, being only partially illustrated in the isometric view of the end section shown in FIG. 2. Fiber optics and methods for forming the individual fibers into a bundle are old and well known and each individual fiber optic may have a diameter as small as 10 microns, that is, approximately 0.0004 inch as mentioned above. Therefore, as many as 25 contiguous fibers may be included in a linear distance of 0.01 inch, that is, the width of the fiber optic bundle as set forth in the above dimensional example of the width of such a bundle.

Before discussing in detail the electrostatic reproduction system such as diagrammatically illustrated in FIG. 1, it will be expedient to first describe a preferred method of fabrication of a control unit according to the invention and as illustrated in FIGS. 2 through 7 of the drawings.

Figure 2:
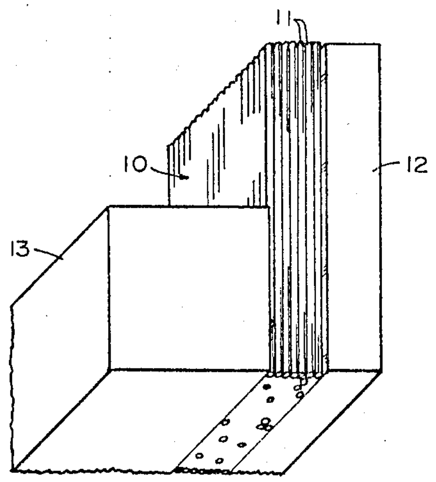
FIG. 2 is an isometric view of an end section of a basic foundation unit comprising support blocks with a fiber optic bundle supported therebetween.
Figure 3:
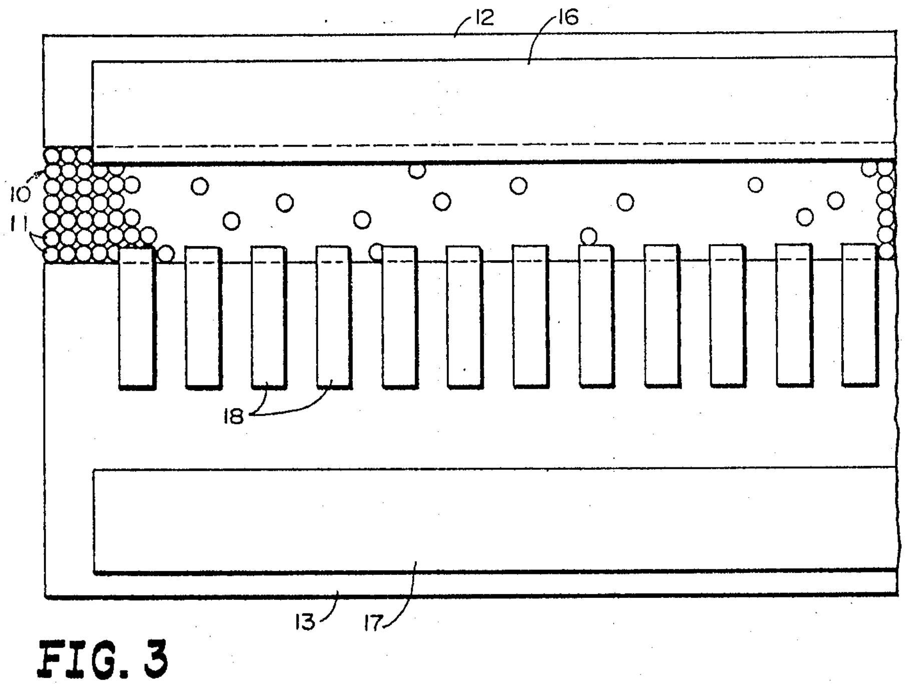
FIG. 3 is a bottom plan view of the section of the basic unit illustrated in FIG. 2 and illustrates the unit following a first step in the fabrication of a control unit in accordance with the method of the invention.

A basic unit such as illustrated in FIG. 2 and comprising a fiber optic bundle 10, and first and second support members 12 and 13, as previously discussed, is inverted as shown in the plan view of FIG. 3, the upturned bottom surface of the basic unit is thoroughly cleaned and dried if necessary, and thereafter a coating or film of an electrically conductive material, preferably tin-antimony oxide, is deposited on the bottom surface of the unit. Although other procedures can obviously be employed for cleaning the bottom surface of the basic unit an extremely satisfactory one was found to be to immerse such surface in a hot solution of a cleaner known as Oakite 19, a well known commercial product of Oakite Products, Inc., New York, N.Y., rinsing such surface in distilled water, immersing the bottom surface of the unit in a 15% solution of hydrochloric acid and again rinsing the surface in distilled water, each step in such procedure being of a duration of 3 to 4 minutes and being performed in an ultrasonic cleaner.

Following the cleaning of the bottom surface of the basic unit, such surface is ready for the application of the electroconductive coating mentioned above. To assure that such coating is applied to only the bottom surface of the unit, the remainder of the unit is covered as, for example, by placing the unit in a jig leaving only such bottom surface exposed. Such jig may, for example, be formed of a hollowed-out block of Transite, a well known commercial material of Johns-Manville, New York, N.Y., the inside perimeter of the opening leading into the hollowed-out portion of the block having a contour conforming to the outside perimeter of the basic control unit adjacent the bottom surface of such unit.

Following the covering of the basic unit, as, for example, by a jig as mentioned above, such unit is placed in a furnace maintained at a temperature so as to uniformly heat the basic unit to a temperature as hot as possible without deforming it, that is, to a temperature at least 20° C. above the annealing temperature, but somewhat below the softening point of the glass used in the basic unit, as, for example, a temperature 100° C. below the softening point of such glass. After approximately a 15 minute heat soak in said furnace, the length of such period depending, of course, on the desired temperature for the unit, the bottom surface of the unit is sprayed from 5 to 10 seconds with an atomized solution of the electroconductive material selected for providing the final electroconductive film or coating on said surface of the unit, such solutions being relatively old and well known. Such final coating or film is preferably, but need not necessarily be, a tin-antimony oxide coating and may be provided on the bottom surface of the basic control unit by using one of the solutions and the method disclosed in Letters Patent of the United States 2,564,706, issued August 21, 1951 to John M. Mochel.

After the deposition of the electroconductive coating solution as discussed above, the thus-far processed basic unit is immediately put through an annealing cycle, such cycle depending, of course, on the glass composition of the basic unit and the temperature at which the electroconductive solution is applied to the unit. Assuming, for example, that the unit was heated to approximately 600° C. for atomizing the electroconductive coating solution onto the bottom surface thereof, immediately after such deposition of the solution the unit is transferred to an annealing furnace set at a temperature of approximately 500° C. After a heat soak of approximately 30 minutes duration at said temperature, the unit is cooled from such temperature to 430° C. at a rate of 1° C. per minute. Below 430° C. the unit may be cooled to room temperature at any rate which will not cause thermal cracking of the unit. It will be readily understood by those skilled in the art that the above annealing cycle is set forth only as one example of such a cycle and that other cycles may be employed depending on the composition of the glass employed in the basic unit and, as mentioned above, the temperature at which the electroconductive coating solution is deposited onto the bottom surface of the unit.

Subsequent to the annealing and the cooling of the electroconductively coated unit to room temperature, the coated bottom surface of the unit is again cleaned in accordance with the procedure outlined for cleaning of such surface prior to the deposition of the electroconductive coating solution.

The previously mentioned pattern of electroconductive coating material on said one end of the support members included in said basic unit is attained by selectively removing portions of the electroconductive coating deposited, as outlined above, on the bottom surface of such unit. Such selective removal of the electroconductive coating is performed by a type of photoreduction technique as briefly described below and as discussed in more detail in a publication of the Eastman Kodak Company, Rochester 4, N.Y., such publication being entitled "Kodak Photosensitive Resists for Industry" and being obtainable from the Sales Service Division of such Company by ordering Kodak Publication No. P–7.

A thin uniform film of a light-sensitive resist coating sold by the Eastman Kodak Company under the name of Kodak Metal-Etch Resist (KMER) is sprayed over the electroconductive coating previously deposited on the bottom surface of the control unit and the unit is then allowed to dry in air at room temperature until the resist coating is dry to the touch, that is, for a duration of approximately 20 minutes. The unit is then baked at a temperature of 120° C. or lower, preferably at a temperature of 110° C., for a period of 20 minutes.

Following the above preliminary steps in the photosensitive resist technique, a high resolution photographic negative of the pattern of the electroconductive coating which is to remain on the bottom surface of the control unit is laid on such surface with the emulsion side of the negative in intimate contact with the light-sensitive resist coating applied as discussed above. The emulsion covered areas of said negative are in a pattern corresponding to the areas of the electroconductive coating which it is desired to subsequently remove. That is, the transparent areas of the negative correspond to the pattern of electroconductive material which it is desired will remain on the bottom surface of the control unit. The configuration of such pattern is best described in reference to FIGS. 3 and 6 of the drawings in which reference 16 indicates a first portion of the electroconductive coating to remain on the bottom portion of the control unit, such portion extending substantially the full length of support member 12 and which may, but need not necessarily, somewhat overlap a small section of the edge of the fiber optic bundle 10 adjacent support member 12. Such coating may, for example, have a width of 0.1 inch and is intended for use as a bus bar as discussed in more detail hereinafter.

A plurality of small sections, such as 18, of the electrically conductive coating material are to remain along the edge of support member 13 adjacent the fiber optic bundle to form a row of electrical contacts each dielectrically isolated from the others. One end of each such contact may, but need not necessarily, overlap the edge of the fiber optic bundle 10 adjacent support member 13 and each such contact may, for example, have a length of 0.1 inch and a width of 0.002 inch, such contacts being left remaining, for example, so as to be spaced on 0.004 inch centers, that is with 0.002 inch between each contact. It will become apparent hereinafter that the greater the number of such contacts extending along the length of the fiber optic bundle 10, the better the printing resolution that will be obtained in using the electrostatic reproducing apparatus. Also to be left remaining on support member 13 is a portion of the electroconductive coating intended to provide a second bus bar 17 similar to bus bar 16 and spaced, for example, 0.0025 inch from the ends of the contacts, such as 18, which are adjacent the second bus bar 17. The use of such bus bar will be discussed in more detail hereinafter.

The pattern of the electroconductive coating to remain on the bottom surface of the control unit having thus been described, the steps for completing the photosensitive resist technique will now be set forth.

The bottom surface of the control unit, with the photographic negative disposed thereon as discussed, is exposed in a vacuum frame to a collimated light beam from a source of near-ultraviolet or ultraviolet light rays, such as from a carbon arc or mercury-vapor lamp, for a period of two to three minutes, for example. However, the optimum period of duration of such exposure will vary in accordance with the type of lamp employed and the distance of the lamp from the control unit, and in accordance with the exact light-sensitive resist coating method employed.

Although other development methods may be employed, it has been found satisfactory to develop the exposed resist coated bottom surface of the control unit by immersing the unit for 10 seconds in an ultrasonic cleaner containing Kodak Metal-Etch Resist (KMER) Developer, such developer also being obtainable from the Eastman Kodak Company. Following such immersion, the unit is rinsed as by immersion in water. Thereafter, the unit is baked for a period of 3 to 20 minutes at a temperature 120° C. or below. A period of 20 minutes at 110° C. has been found to be extremely satisfactory for a unit processed according to the preferred method of processing the unit set forth herein. The bottom surface of the unit is then re-exposed in the previously mentioned vacuum frame for a period of approximately 5 minutes duration to more securely fix the exposed resist.

The parts of the electroconductive coating not covered by the exposed resist coating, that is, the parts of the electroconductive coating covered by the emulsion coated areas of the photographic negative, are removed by an etching solution comprising, for example, one gram of powdered zinc in 50 milliliters of 4% hydrochloric acid, the powdered zinc being wetted down with a few drops of water before addition of the acid solution thereto. The control unit is ultrasonically agitated in the etching solution for a period of approximately 75 seconds, is dipped in concentrated nitric acid for a period of from 5 to 10 seconds and is then rinsed in distilled water. Following these steps in the etching away of the areas of the electroconductive coating, the remaining and exposed photoresist is preferably removed by a solvent, such as xylene.

Figure 6:
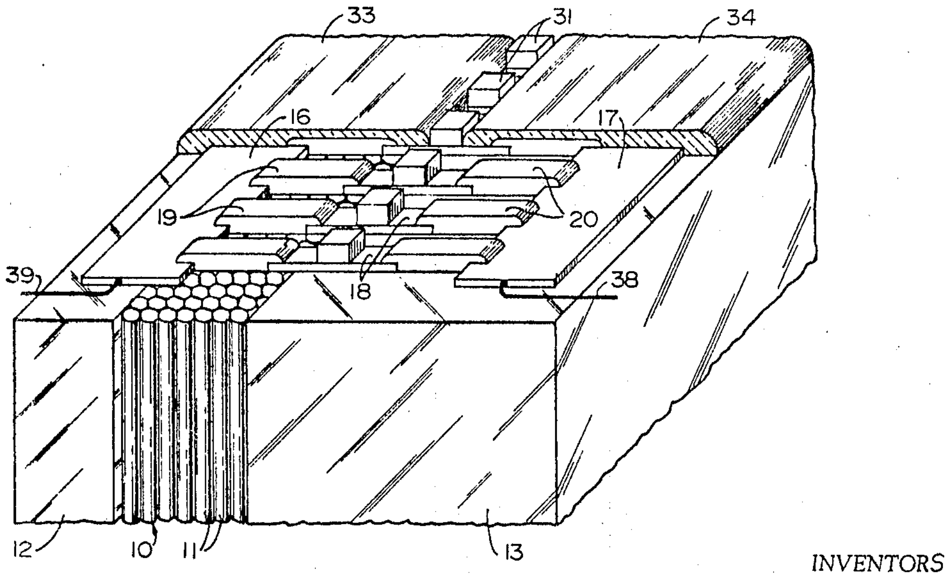
FIG. 6 is an isometric view of an end section of the bottom of the control unit illustrating the unit following still a further step in the fabrication of such a unit in accordance with the invention, such view also showing a portion of the completed control unit removed in order to better illustrate the finished construction of the completed unit.

Following the above steps in the process thus far outlined, the bottom surface of the basic control unit has, as previously outlined, electroconductively coated areas such as illustrated and designated by the reference characters 16, 17 and 18 in FIGS. 3 and 6 of the drawings. The bottom surface of the control unit is now ready for the deposition of the photoconductor cells such as 19 and 20 and best illustrated in FIGS. 4 and 6 of the drawings.

As discussed in detail hereinafter, a first row of discrete photoconductive cells, such as 19, is selectively and uniformly deposited upon the bottom end of the fiber optic bundle 10 (FIG. 4) each such cell being dielectrically isolated from the others and one such cell being provided for each such contact such as 18. Each such cell is intended, as hereinafter discussed, to provide an electrical resistance connection between the end of its respective contact 18, adjacent or overlapping the edge of the fiber optic bundle 10, and the bus bar 16. A second row of discrete photoconductive cells, such as 20, and similar to the first row of cells, is deposited upon support member 13 between the second ends of the contacts 18 and the bus bar 17, one such cell being provided for each contact 18 and each intended to provide an electrical resistance connection between said second end of its associated contact 18 and the bus bar 17. The preferred process for depositing said cells upon the control unit will now be discussed in detail.

A photo-resist solution comprising, by weight, 1 part polyvinyl alcohol, 10 parts distilled water and 0.065 to 0.072 part ammonium or other dichromate is prepared and the solution is used in a mixture comprising, by weight, 3 parts of such solution, 1 part distilled water and 1 part of a preferred photoconductive material comprised mainly a cadmium selenide but including relatively small amounts of cadmium chloride and indium trichloride as discussed below.

From 0.050 to 1.0 gram of indium trichloride is dissolved in approximately 100 milliliters of distilled water and 2.0 grams of cadmium chloride is then dissolved in the indium trichloride solution. 48.0 grams of cadmium selenide is then added to the solution. The resultant mixture is mixed with an electric stirrer for approximately 1 hour and is then placed in an oven at 105° C. until dry. The dried mixture is then placed in a covered container such as a Pyrex brand covered dish and is sintered in an oven at 535° C. for approximately 30 minutes. Thereafter the mixture is allowed to cool and is then broken up as by a glass stirring rod. Amyl alcohol in a sufficient quantity is then added to the material and the material is then ball milled for approximately 64 hours.

The above discussed photo-resist and photoconductive material mixture is subjected to ultrasonic agitation to place the photoconductive material in the mixture in colloidal suspension. The electroconductively coated bottom surface of the control unit is dipped into the mixture, now including such suspension, removed therefrom and the excess of the mixture wiped off the sides of the control unit. The unit is then hung, with the bottom surface vertically disposed, in dust-free air for a period of approximately 20 minutes to permit said surface to drain and dry, leaving thereon a coating of the photoconductive mixture.

Following the drying of the bottom surface of the control unit, a high resolution photographic negative, having thereon a pattern of the photoconductive cells desired on the bottom surface of the control unit, is placed against such surface with the emulsion side of the negative in intimate contact with the photoconductive mixture coating applied as discussed above. The areas of said negative which are not covered by emulsion, that is, the transparent areas of the negative, are in a pattern corresponding to the areas of the photoconductive mixture coating which it is desired will remain on the bottom surface of the control unit to form the aforesaid photoconductive cells. The bottom surface of the control unit is now exposed for approximately 8 minutes, for example to a collimated light beam from a source of near-ultraviolet or ultraviolet rays, such as from a carbon arc or mercury vapor lamp, thereby fixing the photoconductive mixture coating in the pattern desired for the photoconductive cells. The photographic negative is removed and said pattern is thereafter developed by rinsing the bottom surface of the control unit in distilled water, such rinsing removing the photoconductive mixture from the areas of such bottom surface not exposed to said light source, that is, the areas which were beneath the emulsion covered portions of the photographic negative and, therefore, not fixed. The control unit is then dried in an oven at approximately 150° C. for a period of from 5 to 15 minutes. The above-described steps, from and including the dipping of the control unit through the oven-drying, may be repeated if found necessary to build thicker photoconductive cells.

It is pointed out that the photoconductive materials previously discussed can be mixed into Kodak Photo Resist (KPR) rather than using the photo-resist solution and mixture above described, and the photoconductive cells then processed in a manner similar to that outlined above except that Kodak Photo Resist Developer is then used for the developing of the pattern. Kodak Photo Resist and Kodak Photo Resist Developer are sold by Eastman Kodak Company, Rochester 4, N.Y.

Figure 4:
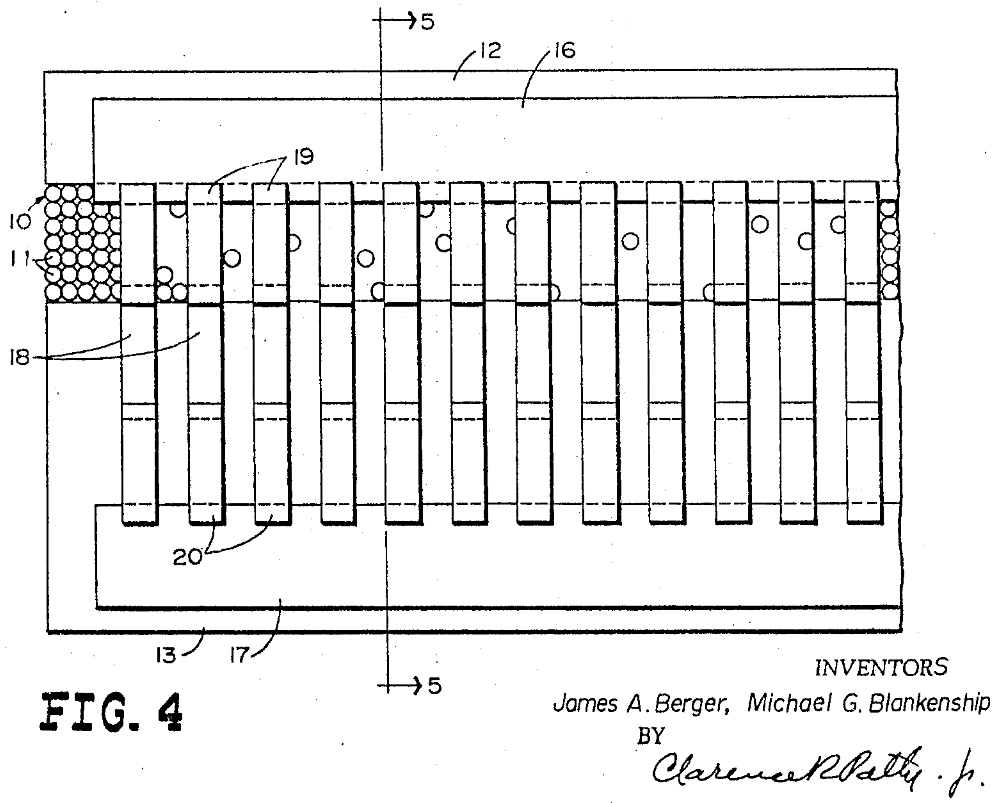
FIG. 4 is a view similar to FIG. 3 and illustrates the control unit subsequent to another step in the fabrication of a control unit according to the invention.

As previously mentioned, the bottom surface of the control unit, following the deposition of the cells of photoconductive material as outlined above, is illustrated in FIG. 4 of the drawings.

After the final exposure and the development of the pattern of cells upon the bottom surface of the control unit as heretofore discussed, the control unit is placed in an oven set at 105° C. for a period of approximately 30 minutes in order to drive off any excess water remaining in the cells. The photoconductive cells are then sintered by heating them to a temperature of approximately 600° C. in a maximum time period of 60 seconds. This may be accomplished by placing the control unit in an oven preheated to 600° C., covering the cells with a sheet of glass on the order 0.125 inch thick and preheated in such oven, and placing a porcelain cover over the unit. The unit is allowed to remain in the oven for the aforesaid maximum period of 60 seconds, such period being measured from the time when the glass sheet and the cover were placed over the unit in the oven to the time the oven door reopened and the covered unit is removed from the furnace still covered by the porcelain cover. The porcelain cover may be removed at any time following a lapse of 5 minutes after removal of said parts from the oven. Such baking of the unit and its deposited photoconductive cells as mentioned above sinters such cells and increases their sensitivity. The unit is kept covered for at least 5 minutes after removal from the oven because increased sensitivity of the cells has been noted if they are dark cooled for at least such period of time.

As shown in FIGS. 1 and 6 of the drawings, electrical connections or leads 38 and 39 are provided to the bus bars 16 and 17, respectively. This may be accomplished, for example, by nickel plating a selected point of each such bus bar and then soldering the leads thereto. A preferred method of such nickel plating is discussed hereinafter in connection with the deposition of electrostatic contacts such as 31 (FIGS. 1 and 6) to the contacts 18 of the control unit.

Following the deposition and sintering of the cells of photoconductive material and the provision of the electrical leads, as discussed above, a two-layer hermetic glass encapsulation is applied to the bottom surface of the control unit. The first layer of glass is applied in two parallel strips covering only the cells of photoconductive material. This is accomplished by covering with masking tape the remainder of the bottom surface of the control unit and spraying a layer of a selected glass frit over the unmasked portions, that is, over the cells of photoconductive material. The glass frit selected for this layer is one having a softening point substantially above the glass frit to be used for the second layer of the two-layer encapsulation, such first layer being intended as a protective layer for the photoconductive cells.

Following the above step the entire bottom surface of the control unit, with the exception of an area approximately 0.002 inch square at the center of each of the contacts 18 (FIG. 6) is covered with the second layer of the two-layer glass encapsulation, such second layer comprising a glass frit composition having a softening point, as pointed out above, substantially below the glass frit employed for the first layer, such second glass frit being applied to the bottom surface of the control unit by spraying the frit onto such bottom surface to a depth of approximately 0.0005 to 0.002 inch. Following such application of the second layer of glass frit the control unit is placed in an oven set at the softening temperature of such frit and fired for a period of approximately 40 minutes to seal such glass frit layer. The unit is then removed from said oven and placed in another oven set at a temperature somewhat below the softening temperature of the second glass frit layer. Such layer is then annealed by lowering the temperature in the annealing oven at a rate of 1° C. per minute until a second preselected temperature is reached.

It will be readily understood that the temperature selected for sealing and annealing the second glass frit layer depends on the specific glass frit composition employed for such layer and the thickness of the layer. For example, one glass frit composition having a softening temperature of 430° C. has been sealed by baking a control unit, coated with such frit to a depth of 0.0005 to 0.002 inch, in an oven set at 430° C. for a period of 40 minutes. The glass coating was then annealed by placing the unit in an oven set at 380° C. and lowering the temperature of the oven to 350° C. at the rate of 1° per minute.

Returning to the areas of the contacts 18 not covered by the glass encapsulation applied to the components on the bottom surface of the control unit, such areas can be exposed in several ways. One manner of leaving such areas exposed is by covering the areas with a metal bar having a width of approximately 0.002 inch (bar such as 36 illustrated in FIG. 5 of the drawings) prior to and during the spray application of the second glass frit layer. However, a preferred method of exposing said areas of contacts 18 is discussed below.

The entire bottom surface of the control unit and the components deposited thereon are covered by the second layer of glass frit, such layer being of a composition which is subject to the action of an etchant to which the supporting members 12 and 13, the contacts 18, and the fiber optic bundle 10 are not subject, such as nitric acid, for example. Such encapsulation is thereafter annealed in the manner previously discussed. After the annealing cycle and the cooling of the control unit, the second layer of glass frit is etched away from the desired areas of the contacts 18. This is accomplished by a photo-resist technique similar to that previously discussed and as briefly described below.

Prior to the etching of the glass frit encapsulation on the control unit, such encapsulation is lightly polished to even off any irregularities in the exposed surface of the encapsulation. Such surface is then sprayed with a coating of a mixture of Kodak Metal-Etch Resist (KMER) and Kodak Metal Etch Resist Additive D Formula, as described in the aforementioned Kodak Publication No. P-7, and a line 0.001 inch wide and extending the length of the control unit at the center of each of the contacts 18 is provided by using a photographic negative masking technique similar to that previously discussed. That is, the entire bottom surface of the control unit with the exception of said line is exposed, following the drying of said coating, to a light source, and the pattern thereon is thereafter developed as previously discussed. Following the development of the exposed pattern, the bottom surface of the control unit is dried and then re-exposed to harden the photo-resist coating. The unprotected glass beneath the 0.001 inch wide line is then etched away and off the selected areas of the contacts 18 by immersing the bottom surface of the unit in a 12% solution of nitric acid for a period of 10 to 15 seconds and employing ultrasonic agitation, such surface thereafter being rinsed in distilled water. The 0.001 inch wide line etches to approximately a 0.002 inch wide groove and the desired areas of the contacts 18 are thus exposed. The remaining photo-resist coating on the bottom surface of the control unit is then removed by a solvent such as xylene, for example. Reference is again made to the previously cited publication of Eastman Kodak Company for a more detailed description of the above discussed photo-resist technique and especially to the section in such publication relating to glass and ceramics.

Following the techniques thus far outlined, electrostatic printing contacts such as 31 and of a durable material such as nickel (FIGS. 1 and 6) are deposited on the exposed area of each of the contacts such as 18. Although reduction of the electroconductive coating on the exposed areas of the contacts 18 may be performed prior to the deposition of the printing contacts if desired, it has been found satisfactory to deposit such contacts with or without reduction of such coating, the contacts being deposited in either case in the same manner, the method of depositing such contacts being well known and being only briefly discussed below.

The bottom surface of the control unit is first momentarily dipped into a hypophosphite solution. The unit is then placed in a bath of a commercial nickel plating solution known as Renidize and sold by the Cahill Chemical Corporation, 136 Silverlake Avenue, Providence, Rhode Island, such bath being maintained at a temperature of approximately 85 to 90° C. and the control unit remaining in such bath until nickel plated contacts between 0.0005 to 0.002 inch in thickness are deposited on the exposed areas of the contacts such as 18 on the bottom surface of the control unit. The unit is then removed from the bath and baked at a temperature of approximately 250° C. for a period of about one hour, such heat treatment improving the hardness and adhesion of the electroless nickel plate.

The control unit is now complete and the bottom surface thereof has the configuration illustrated in FIG. 6 of the drawings, the glass encapsulation indicated at 33 and 34 being illustrated as cut away in order to better illustrate the arrangement of the various components provided thereunder on the bottom of the support members 12 and 13 and the fiber optic bundle 10.

It is desirable that the exposed surface of each contact 31 extend in substantially the same plane as the flat surface of the encapsulation indicated at 33 and 34. If found necessary to obtain the evenness in level of such surfaces, the surface of the encapsulation may be polished down to the level of the surfaces of contacts 31 thereby also assuring an extremely smooth surface on the encapsulation, which surface comes in contact with the special dielectric paper used in the electrostatic printing apparatus as discussed below.

In actual use in an electrostatic reproduction apparatus, the control unit, having the construction such as shown in FIG. 6 and described above, is supported, as illustrated in FIG. 1, in any convenient manner with the exposed end of the fiber optic bundle 10 facing normal to the path of movement of a sheet of printed material such as a typewritten list 27 which moves in the direction indicated by the arrow above the list at a speed, for example, of 2 inches per second, and which list has typewritten matter to be reproduced imprinted on the side thereof faced by the exposed end of bundle 10, that is, the bottom side of the list as viewed in FIG. 1.

A special dielectric or electrostatic printing paper 28 is arranged to move against the printing contacts indicated at 31 and provided on the bottom of the control unit, as previously discussed. The paper moves in the direction indicated by the arrow below such paper and at a speed identical to that of the printed list to be reproduced, that is, as in the example presented, at a speed of 2 inches per second. The dielectric paper moves between the printing contacts, such as 31, provided on the bottom of the control unit and a contact bar 32 which extends the full length of the control unit, that is, completely across the full width of printing paper 28. Dielectric or electrostatic printing paper, such as 28, is commercially well known and such paper may, for example, be of the type sold by the A. B. Dick Company, 5700 W. Touhy Avenue, Chicago, Illinois, under the name of Type SD 47 Videograph paper.

A light source 22 illuminates, as indicated at 26, the printed surface of the typewritten list 27 which is to be reproduced and the light-colored (unprinted) areas of such surface reflect light onto the ends of some of the fiber optics 11 of bundle 10 facing the paper, such light traveling through each such individual illuminated fiber optic to impinge upon one or more of the photoconductive cells 19 of the row of such cells deposited upon the first end of the fiber optic bundle, the electrical resistance of each such cell 19 thus illuminated being substantially reduced as, for example, from a resistance of $1\times10^{10}$ ohms when completely dark to a resistance of $5\times10^{8}$ ohms when illuminated by 15 foot candles of light. The typewritten (printed) areas of the list 27 do not reflect light from the illuminated surface of the list and, therefore, corresponding ones of the individual fiber optics 11 below the list do not transmit light to associated ones of the photoconductive cells 19 of the row of such cells on the bottom or said first end of the fiber optic bundle 10. Such unilluminated cells have at such time a relatively high electrical resistance as mentioned above. It may, therefore, be said that the photoconductive cells 19 are selectively and sequentially rendered relatively electrically conductive and non-conductive in patterns, such patterns corresponding to the arrangement of the printed matter appearing on list 27 and changing in accordance with the sequence of change in such arrangement as the list moves past the ends of the fiber optics 11.

A pulsed source of direct current energy 29 having an electromotive force, for example, of 400 to 600 volts is provided for printing operation of the apparatus, such source being pulsed, for example at the rate of 500 cycles per second. Conductor 38 affixed to bus bar 17 of the control unit in FIG. 6 is connected to the negative terminal of said source of energy, and conductor 39 affixed to bus bar 16 of the control unit is connected to the previously discussed contact bar 32 and to the positive terminal of the energy source.

Light from source 22 is reflected by a mirror 23, as indicated at 24, onto the top surface of the transparent support member 13 and is transmitted onto each photoconductive cell 20 of the row of such cells provided on the bottom surface of member 13, each such cell being thus illuminated by 20 foot candles of light, for example. Each such cell is, therefore, rendered relatively electrically conductive so long as light from source 22 is transmitted to such cells, the resistance of such cells at such time being on the order of something less than $5\times10^{8}$ ohms.

In the actual operation of the apparatus of FIG. 1, at the time any one photoconductive cell 19 is illuminated, a circuit is completed from the positive terminal of said source of energy 29, over conductor 39 to bus bar 16, over the illuminated cell 19 to the associated contact 18 and thence, over the corresponding photoconductive cell 20 of the row of such cells provided on the bottom surface of the support member 13, to bus bar 17 and over conductor 38 to the negative terminal of the source of control energy 29. At such time substantially no current passes from contact bar 32 to the printing contact 31 provided on said contact 18, due to the relatively high resistance of the dielectric paper 28 (on the order of $5\times10^{10}$ ohms) as compared with the resistance of the associated photoconductive cells 19 and 20. Thus, at such time, no charge relative to said contact 31 is placed upon or in the printing paper. However, any photoconductive cell 19 which becomes unilluminated, due to a portion of a printed symbol etc. appearing on list 27 above the fiber optic or optics 11 associated with such cell, becomes also substantially nonconductive and presents a sufficiently high resistance to the passage of electrical current, compared with the resistance of the path extending from contact bar 32 through the dielectric paper 39 to the printing contact 31 associated with the nonconductive cell 19, that current flows through the latter path and places an electrostatic printing charge upon or in the paper at the point of contact with the paper of the respective printing contact 31.

It will be apparent in the light of the foregoing discussion that electrostatic charges are placed upon the dielectric paper 28 in patterns corresponding to the printed matter appearing on the typewritten paper or list 27. The charged dielectric paper 28 is subsequently exposed to electrostatically attractable powder commonly known as a toner and such powder becomes deposited upon the dielectric paper at the charged areas thereof. The deposits of the toner are thereafter permanently fused to the dielectric paper as by heat and as is well known in the art.

In the foregoing examples of the spacing of the discrete photoconductive cells, that is, on centers of 0.004 inch, a printing resolution of 250 lines per inch across the width of the printing paper 28 is obtained. Similarly, with a direct current source pulsed at 500 cycles per second, and the list 27 and the printing paper 28 each moving at speeds of 2 inches per second, a printing resolution of approximately 250 lines per inch may be obtained along the length of the printing paper. It will be understood by those skilled in the art that the printing resolution along the length of the paper is dependent on the response and decay characteristics of the photoconductive cells taken in conjunction with the speed of movement of the list 27 and the dielectric paper 28, and the rate of pulsing of the energy from the direct current source 29.

Figures 5, 7:
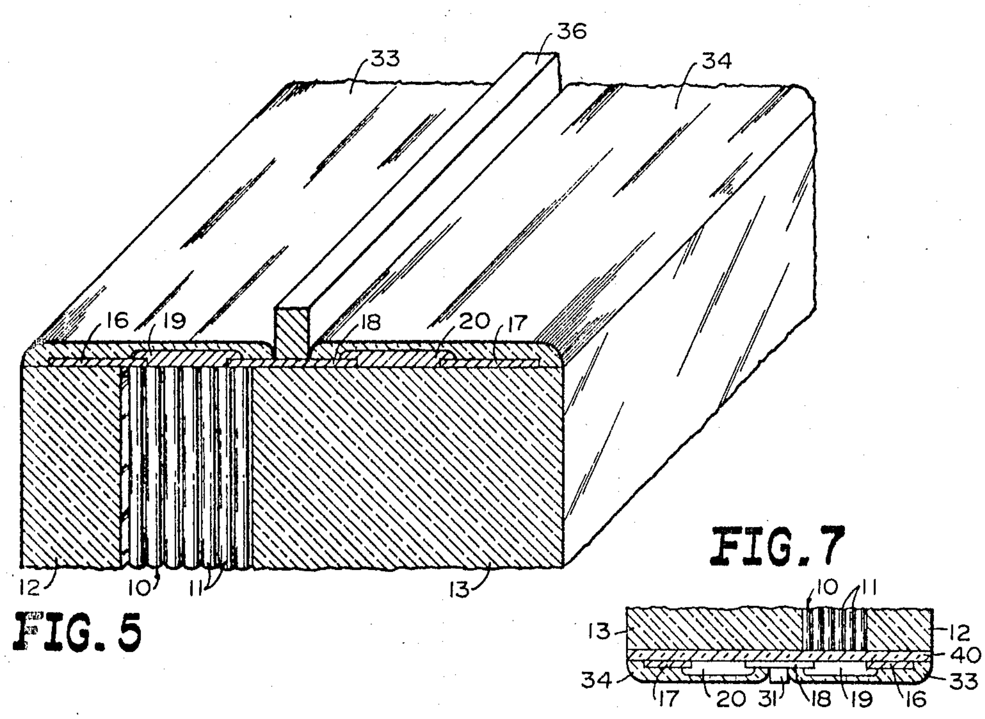
FIG. 5 is an isometric view of a cross-section of part of the bottom of the control unit already fabricated in accordance with the steps illustrated in FIGS. 3 and 4, such view being taken on line 5—5 of FIG. 4 and illustrating the control unit following an additional step in the fabrication of such unit.
FIG. 7 is a cross-sectional end view of the bottom portion of a control unit, such view illustrating an alternate construction for such a unit fabricated in accordance with the invention.

Referring to the alternate construction for the control unit as illustrated in FIG. 7 of the drawings, the bus bars 16 and 17, the contacts such as 18 and 31, the photoconductive cells such as 19 and 20 and the encapsulation indicated at 33 and 34, are all provided or deposited on one side of a thin flat transparent dielectric substrate 40, in configuration identical to that previously described for the arrangement of such components on the bottom surfaces of the support members 12 and 13, and the fiber optic bundle 10. The substrate 40 is preferably glass and is affixed, as by a transparent cement, to the bottom surfaces of support members 12 and 13, and fiber optic bundle 10, so that the components on the substrate 40 are arranged in the same relationship adjacent to the fiber optic bundle and the support members as when such components are provided directly on the bottom surfaces of such members and bundle as illustrated in FIG. 6.

It will be apparent that a control unit constructed in the manner illustrated in FIG. 7 will operate in the printing system illustrated in FIG. 1 in a manner identical to that heretofore described for the operation in such a system of the control unit shown in FIG. 6, and no further discussion of the construction or operation of a control unit such as illustrated in FIG. 7 is believed necessary.

It is to be understood that no claim is made herein to the reproduction system or apparatus per se illustrated in FIG. 1 of the drawings but that the invention which it is desired to protect by Letters Patent are the methods of fabrication of the control units such as shown in the drawings and whose construction is hereinbefore described.

It will be apparent that various modifications and changes may be made in the methods of fabrication of the control units illustrated and described herein, and it is pointed out that the invention in which exclusive rights are desired is not intended to be confined to the details of the specific embodiments disclosed but is to be limited only by the spirit and scope of the appended claims.

What is claimed is:

1. The method of fabricating a control unit for electrostatic image recording apparatus, such method comprising; providing a longitudinal laminated basic support which includes a first fiber optic bundle member sandwiched between a second and a third support member, at least such second support member being dielectric and transparent and at least one longitudinal surface of each of such three members extending in the same plane to form a common planar surface having the individual fiber optics of said first member disposed normal to such surface; providing a pattern of a thin electrically conductive coating material adjacent said planar surface, such pattern comprising first and second coated areas extending substantially the full length of said longitudinal surfaces of said second and third support members respectively to form first and second bus bars respectively, and such pattern also including a row of narrow closely adjacent coated areas extending adjacent said planar surface between said bus bars and isolated therefrom and from each other to form individual discrete electrical conductors; providing a pattern of a thin photoconductive coating material adjacent said planar surface, such pattern comprising a first row of narrow closely adjacent coated areas extending between and overlapping said first bus bar and first ends of said discrete conductors to form a first row of discrete photoconductive cells isolated from each other, and such pattern also including a second row of narrow closely adjacent coated areas extending between and overlapping said second bus bar and second ends of said discrete conductors to form a second row of discrete photoconductive cells isolated from each other and adjacent the ends of the individual fibers of said fiber optic bundle member; providing first and second electrical leads connected to said first and second bus bars respectively to supply electrical control current to said bus bars; encapsulating the components provided adjacent said planar surface, excepting the free ends of said electrical leads and a selected area in the vicinity of the center of each of said discrete electrical conductors, with a thin smooth layer of a dielectric material to protect the encapsulated components; and depositing a durable electrically conducting material upon said selected area of each of said discrete electrical conductors to form electrostatic printing contacts, the summit of the exposed surface of each such printing contact being substantially even with the summit of the exposed surface of said layer of dielectric material.

2. The method in accordance with claim 1 wherein said third support member comprises an opaque material.

3. The method in accordance with claim 1 wherein said cells, conductors and contacts are deposited on a thin glass substrate which is affixed to said common planar surface of said laminated basic support.

4. The method of fabricating a control unit for electrostatic reproduction apparatus in which an image to be reproduced travels in a preselected path of movement, such method comprising, providing a first support member and a second transparent support member of a dielectric material, each such member having at least two adjoining planar surfaces adapted to extend transversely said path of movement, forming a lamination of such members with a bundle of fiber optics sandwiched between first of said planar surfaces of each of said support members with the cross-sectional surfaces of first ends of the individual fiber optics and second planar surfaces of the support members which adjoin said first planar surfaces of such members extending in a common planar surface and so that when such common planar surface is thereafter disposed transversely said path of movement the cross-sectional surfaces of the second ends of the individual fiber optics face such path normal thereto, coating the entire expanse of said common planar surface with a thin layer of an electroconductive material to form an adherent coating covering such surface; masking selected areas of such coated surface in a desired pattern of areas of electroconductive coating to be allowed to remain on such surface, such pattern comprising, a first area extending substantially the full length of said second planar surface of said first support member to form a first bus bar, a second area extending substantially the full length of said second planar surface of said second support member to form a second bus bar, and a row of narrow closely adjacent areas extending between said bus bars and isolated therefrom and from each other to form individual discrete electrical conductors; etching off the unmasked areas of said electroconductive coating to leave the desired pattern of coated areas on said common planar surface, removing the mask from said selected areas, submerging said common surface in a solution of photoconductive material to provide a coating of such material on said surface and the electroconductively coated areas thereof, drying the photoconductor coated surface in dust free air; masking selected areas of such coated surface in a desired pattern of areas of photoconductive coating to be allowed to remain on such surface, such pattern comprising, a first row of narrow closely adjacent coated areas extending between and overlapping said first bus bar and first ends of said discrete conductors to form a first row of discrete photoconductive cells isolated from each other and disposed adjacent said first ends of the individual fiber optics, and a second row of narrow closely adjacent coated areas extending between and overlapping said second bus bar and second ends of said discrete conductors to form a second row of discrete photoconductive cells isolated from each other; rinsing off the unmasked areas of said photoconductive coating to leave the desired pattern of photoconductive areas on said common planar surface, drying the coated surface, sintering said cells to improve their sensitivity to light, soldering first ends of first and second electrical leads to said first and second bus bars respectively; encapsulating said components provided on said common surface, excepting the second ends of said electrical leads and a selected area in the vicinity of the center of each of said discrete electrical conductors, by selectively spraying said surface with a glass frit composition to form a coating for protection of said components and having a flat exposed surface; heating said encapsulating material to seal the encapsulating coating, plating a durable electrically conductive material onto said exposed area in the vicinity of the center of each of said discrete electrical conductors to form an electrostatic printing contact thereon, and polishing said exposed flat surface of said encapsulation so that such surface and the exposed surfaces of said printing contacts extend substantially in the same plane.

5. The method in accordance with claim 4 wherein the first mentioned masking step is performed by a photoresist technique.

6. The method according to claim 5 wherein the second mentioned masking step is performed by a photoresist technique.

7. The method in accordance with claim 4 wherein said first support member comprises an opaque material.

8. The method in accordance with claim 7 wherein said second support member is glass.

No references cited.

JOHN F. CAMPBELL, *Primary Examiner.*

W. I. BROOKS, *Assistant Examiner.*